United States Patent
Tomotaki et al.

[11] Patent Number: 5,984,501
[45] Date of Patent: Nov. 16, 1999

[54] SUPER-PRECISION POSITIONING SYSTEM

[75] Inventors: Katsura Tomotaki; Shinichi Nomura; Heung Chul Shin, all of Narashino, Japan

[73] Assignee: Seiko Seiki Kabushiki Kaisha, Japan

[21] Appl. No.: 08/823,213

[22] Filed: Mar. 24, 1997

[51] Int. Cl.$^6$ .................................................. B23Q 16/00
[52] U.S. Cl. ..................... 364/167.02; 318/560
[58] Field of Search ................... 310/317, 328; 318/560–685; 364/167.01, 167.02

[56] References Cited

U.S. PATENT DOCUMENTS

| | | | |
|---|---|---|---|
| 3,902,085 | 8/1975 | Bizzigotti | 310/8.3 |
| 4,410,951 | 10/1983 | Namamura | 364/559 |
| 4,814,622 | 3/1989 | Gregory | 250/306 |
| 4,987,526 | 1/1991 | Slocum | 364/167.01 |
| 5,404,066 | 4/1995 | Moriwaki | 310/328 |

Primary Examiner—Thomas R. Peeso
Attorney, Agent, or Firm—Adams & Wilks

[57] ABSTRACT

A positioning system comprises a feeding mechanism having three or more feeding units disposed in a moving direction of a moving body. Each of the feeding units has first and second moving elements for clamping and unclamping the moving body, feeding the moving body in the moving direction from an initial position to a target position, and returning the moving body to the initial position. A memory device stores preselected phase and amplitude values of the first and second moving elements. A calculating device calculates phase and amplitude command values for the first and second moving elements based on the phase and amplitude values stored in the memory device. An output device outputs driving command values to the first and second moving elements based on the calculation result of the calculating device. A control device controls the feeding units to clamp the moving body by all of the feeding units after the moving body has been moved to the target position.

10 Claims, 16 Drawing Sheets

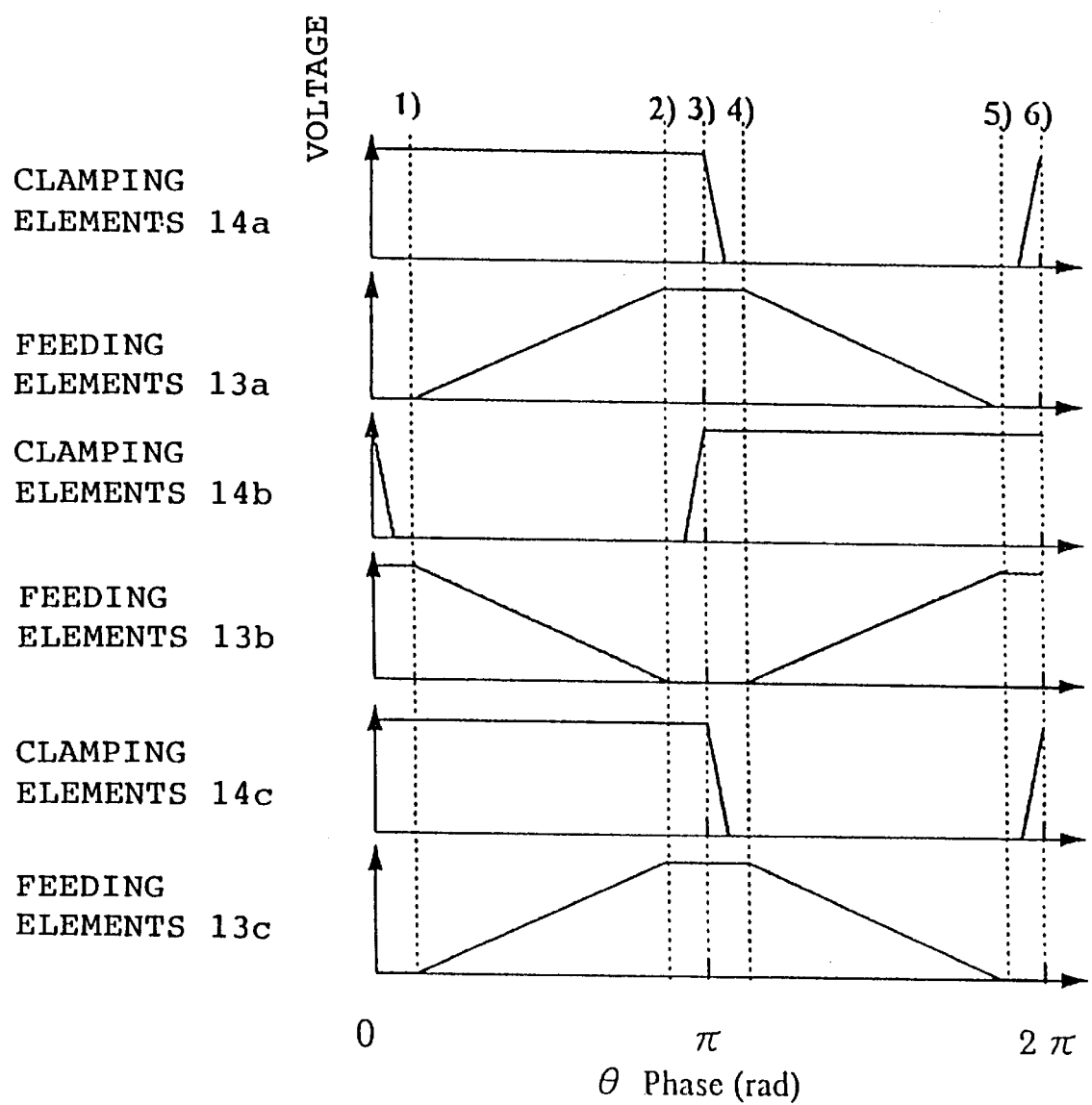
F I G. 5

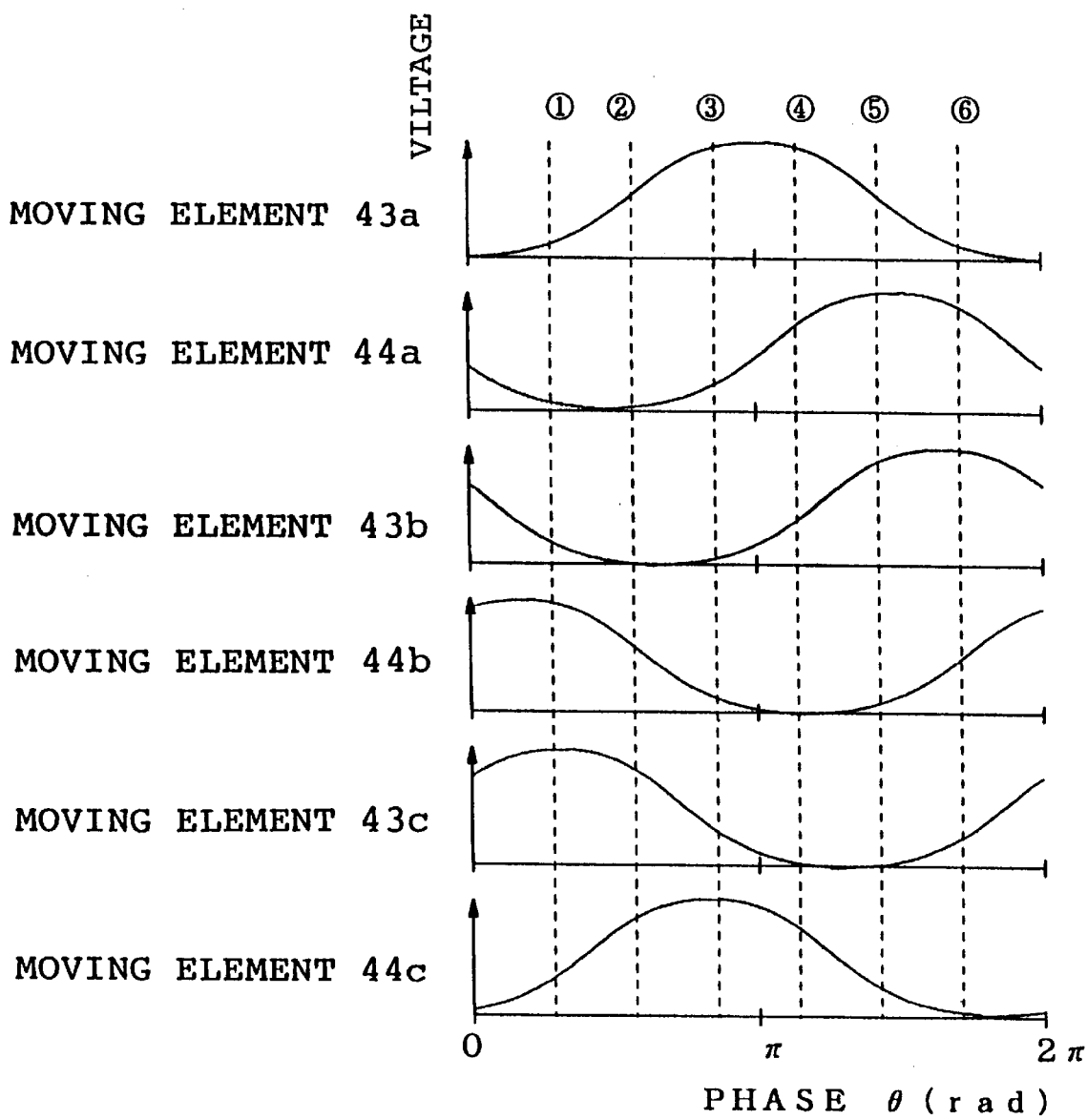
F I G. 7

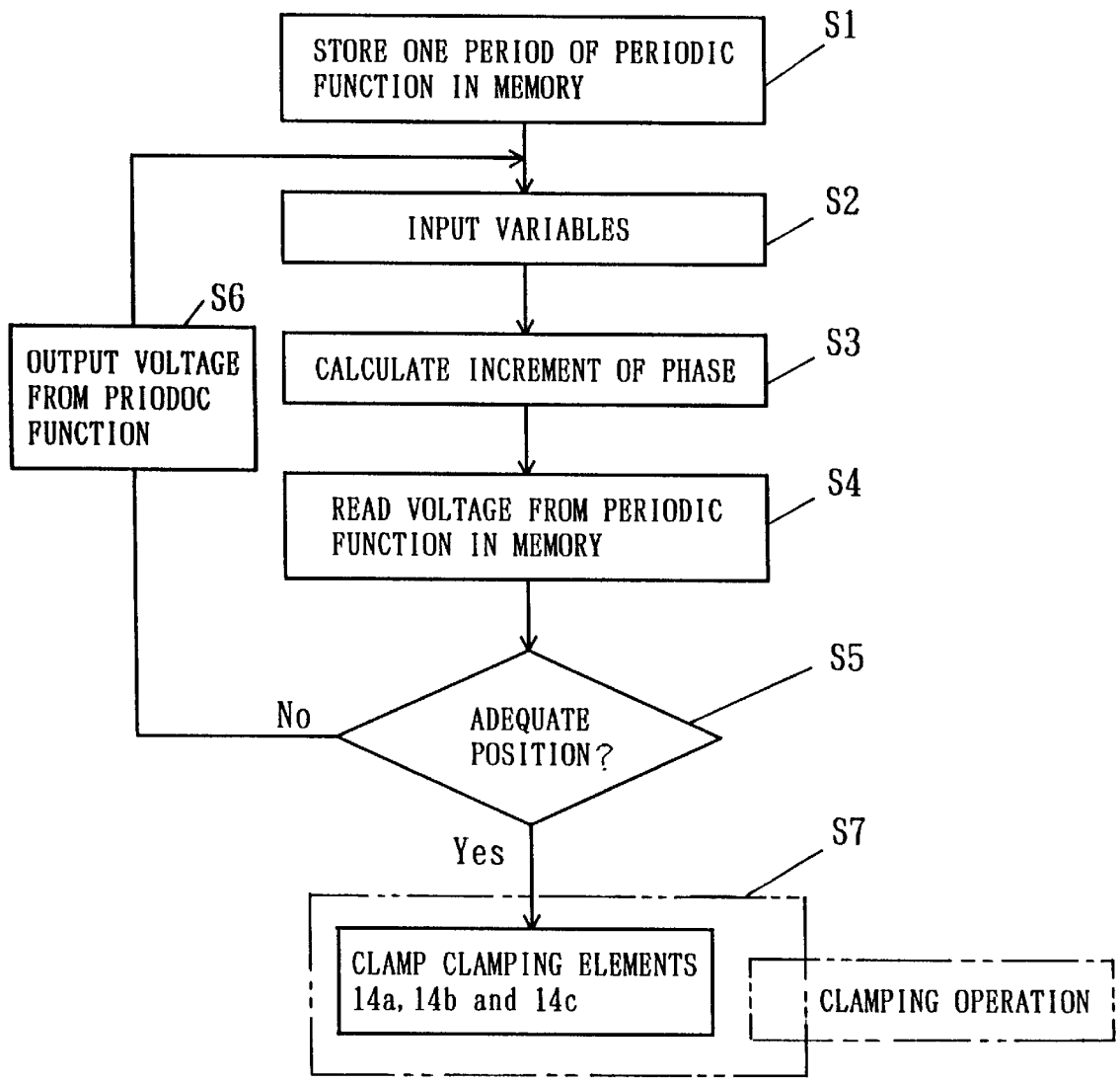
F I G. 9

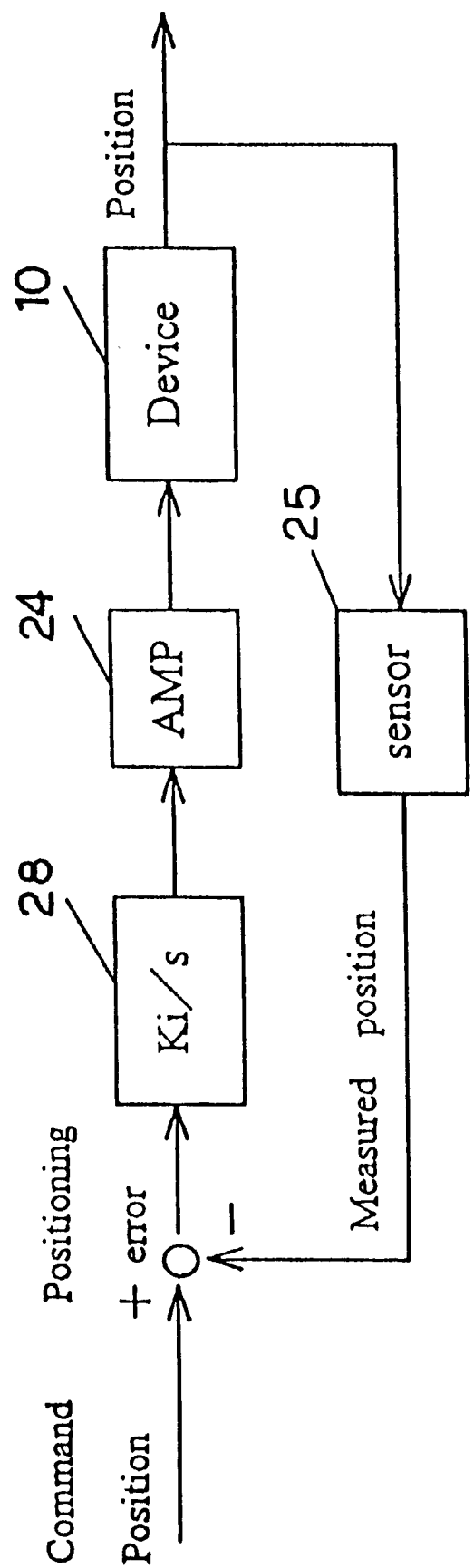
F I G. 14

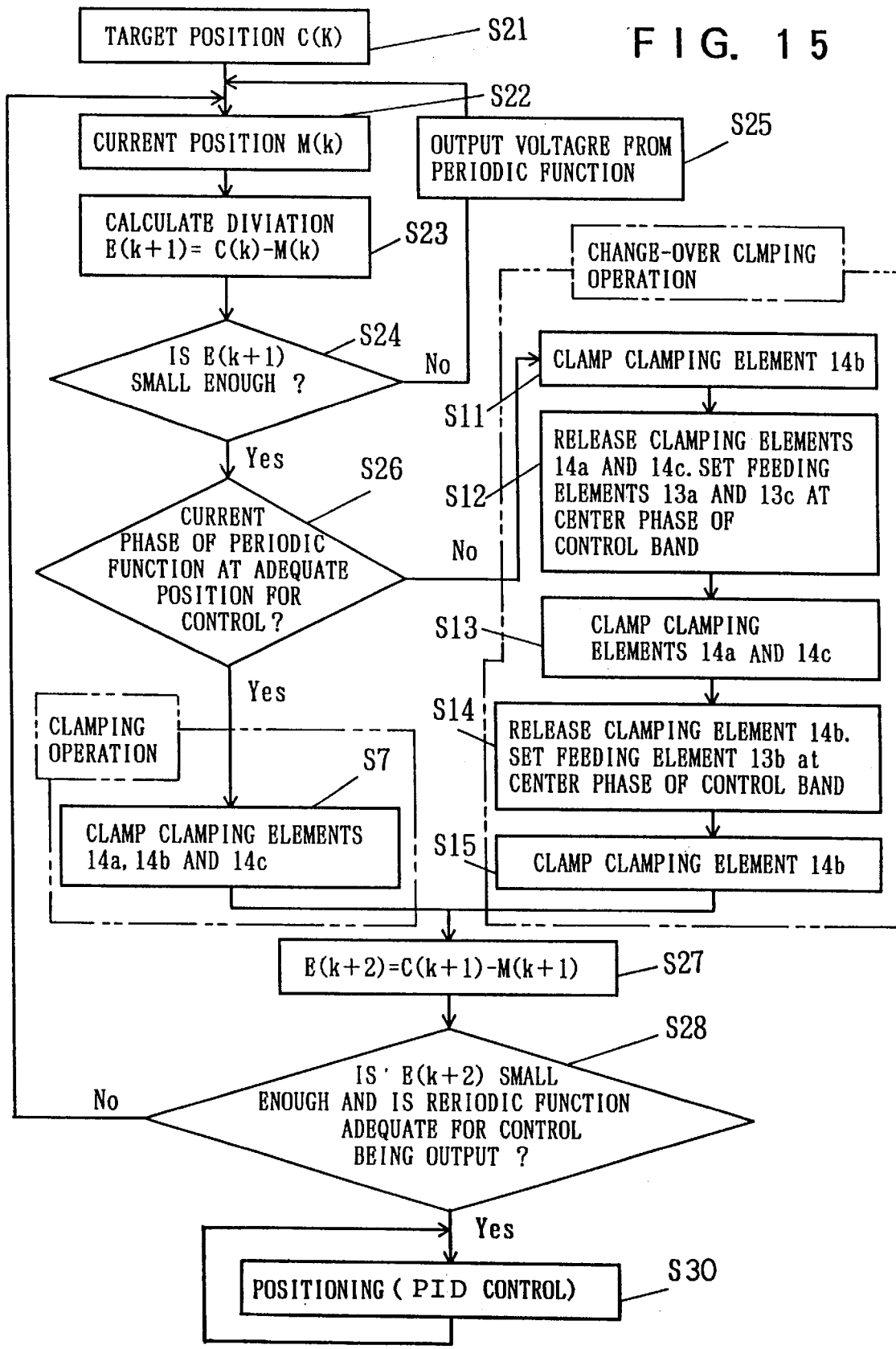
F I G. 1 5

SUPER-PRECISION POSITIONING SYSTEM

BACKGROUND OF THE INVENTION

The present invention relates to a super-precision positioning system and more particularly to a super-precision positioning system which realizes a move of long stroke and a high rigidity.

With the recent advancement of precision of super-precision machine tools, semiconductor related equipment and measuring instruments, it has been strongly desired to improve performance of a super-precision positioning system and a super-precision feeding system which are important components of those equipment. A piezoelectric element is often used as an actuator in the system which requires high rigidity, high resolution and the like among those systems. However, the piezoelectric element has a disadvantage that its displacement is very small. In order to make up for such disadvantage, a spanworm method, a method combined with Walking Drive and a coarse actuator, a method utilizing rapid deformation of the piezoelectric element and the like have been proposed. Although these methods allow the piezoelectric element to be driven for a long stroke, it cannot be said that the rigidity of the piezoelectric element is fully utilized from the aspect of the rigidity when it is used in a positioning system.

The circumstances around this point will be explained by exemplifying the spanworm method. FIG. 17 shows the driving principle of the spanworm method which has been implemented since the past and FIG. 18 shows patterns of driving voltages applied to each piezoelectric element used in the spanworm method. In FIG. 17, a pair of feeding elements 3 are secured to a pair of supporting sections 2 provided at spatial positions which face each other while interposing a moving body 1 therebetween so that the center the elements 3 is supported by the supporting sections 2. One end of pairs of clamp elements 4a and 4b are secured to both ends of the pair of feeding elements 3 such that the other end of the clamp elements are opened to be extendible.

Next, the operation of the spanworm method will be explained based on FIG. 18. Numbers marked at the upper part of FIG. 18 represent timings. Each timing of 1 through 6 corresponds to steps 1) through 6) in FIG. 17. The horizontal axis represents a phase (it is shown as $2^1$ radians until when one period of the operation of the spanworm method is completed and the vertical axis represents a voltage value to be applied to each piezoelectric element. FIG. 18 shows each voltage pattern of the clamping element 4a, the feeding element 3 and the clamping element 4b. At first, at Timing 1, the clamping element 4a is released and the clamping element 4b is clamping the moving body 1. Next, the feeding element 3 extends while clamping the moving body 1 by the clamping element 4b between Timing 1 and Timing 2. Accordingly, the moving body 1 is driven in the right direction. At Timing 2, a stroke of the feeding element 3 reaches its limit and the clamping element 4a clamps the moving body 1 at Timing 3. Then, the clamping element 4b releases the clamp at Timing 4. The feeding element 3 contracts to the original state in order to restore the stroke between Timing 4 and Timing 5. During this time, the moving body 1 is driven in the right direction further. At Timing 5, the contraction of the feeding element 3 reaches to its limit and the clamping element 4b clamps the moving body 1. After that, the clamping element 4a releases the clamp at Timing 6, thus returning to Timing 1. The moving body 1 is driven in the right direction for a long stroke by repeating such operations, though it is not continuous operation.

However, while at least either one of the clamping elements always clamps the moving body 1 to support the moving body 1 during the operation of one such period, the clamping elements 4a and 4b clamp the moving body 1 in the same time only at small periods of time between Timing 3 and Timing 4 and Timing 5 and Timing 6. Accordingly, seeing the phase of the clamping elements after positioning, one or two clamping elements clamp the moving body 1 and an enough rigidity may not be realized even though a highly rigid piezoelectric element is used. While the rigidity increases almost proportionally with an increase in the number of the clamping elements clamping the moving body 1, the rigidity is cut almost into a half in case of the above-mentioned spanworm method because one clamping element clamps the moving body 1 most of the time as compared to a case when two clamping elements clamp the moving body 1.

Accordingly, it is an object of the present invention to solve the above-mentioned prior art problem by providing a super-precision positioning system which allows driving in a long stroke, which is highly rigid and which can position at super precision.

SUMMARY OF THE INVENTION

In order to solve the aforementioned problem, according to the present invention, a super-precision positioning system comprises a feeding mechanism comprising a plurality of feeding units, in the moving direction of a moving body, in which first and second moving elements which clamp and release the moving body or feed/return the moving body in the moving direction are combined within a plane to which the clamping and moving directions of the moving body belong; memory means for storing phase and amplitude values of the first and second moving elements in advance to repeatedly carry out a series of operations of clamping the moving body by any one of the feeding units, extending it in the moving direction to feed the moving body and then releasing and contracting it in the moving direction by changing the phase per each the feeding unit; phase-and-others calculating means for calculating phase and amplitude command values which are to be given to the first and second moving elements from the phase and amplitude values stored in the memory means; driving command value output means for outputting driving command values to the first and second moving elements based on the calculation result of the phase-and-others calculating means; and clamping means for clamping the moving body at least by two or more feeding units after when the move of the moving body is completed.

According to the present invention or specifically to claim 2 thereof, the super-precision positioning system is arranged such that the phase and amplitude command values to be given to the first and second moving elements are calculated by the phase-and-others calculating means from at least either from the target moving position or the moving speed of the moving body and the phase and amplitude values stored in the memory means in advance.

According to the present invention or specifically to claim 3 thereof, a super-precision positioning system comprises a feeding mechanism comprising a plurality of feeding units, in the moving direction of a moving body, in which first and second moving elements which clamp and release the moving body or feed/return the moving body in the moving direction are combined within a plane to which the clamping and moving directions of the moving body belong; a position sensor for detecting a current position of the moving body in the feeding direction; memory means for storing phase and amplitude values of the first and second moving elements in advance to repeatedly carry out a series of operations of clamping the moving body by any one of the feeding units, extending it in the moving direction to feed the moving body and then releasing and contracting it in the moving direction by changing the phase per each feeding unit; phase-and-others calculating means for calculating phase and amplitude command values which are to be given to the first and second moving elements from a target moving position of the moving body and from the phase and amplitude values stored in the memory means; driving command value output means for outputting driving command values to the first and second moving elements based on the calculation result of the phase-and-others calculating means; change-over clamping means for clamping or releasing the feeding units alternately while keeping the moving body at rest when the moving body reaches to the target moving position, for setting a feeding position of the feeding unit at an intermediate position of an expansion span when the feeding unit is released and for clamping the moving body at least by two or more feeding units after that; and feedback control means for performing position feedback control on the feeding unit in the moving direction after completing to clamp the moving body by the change-over clamping means based on a positioning error between the target moving position of the moving body and the current position of the moving body.

According to the present invention or specifically to claim 4 thereof, the super-precision positioning system is arranged such that the phase and amplitude command values to be given to the first and second moving elements are calculated by the phase-and-others calculating means from the target moving position and the moving speed of the moving body and from the phase and amplitude values stored in the memory means in advance.

According to the present invention or specifically to claim 5 thereof, a super-precision positioning system comprises a feeding mechanism comprising a plurality of feeding units, in the moving direction of a moving body, in which first and second moving elements which clamp and release the moving body or feed/return the moving body in the moving direction are combined within a plane to which the clamping and moving directions of the moving body belong; a position sensor for detecting a current position of the moving body in the feeding direction; memory means for storing phase and amplitude values of the first and second moving elements in advance to repeatedly carry out a series of operations of clamping the moving body by any one of the feeding units, extending it in the moving direction to feed the moving body and then releasing and contracting it in the moving direction by changing the phase per each the feeding unit; phase-and-others calculating means for calculating phase and amplitude command values which are to be given to the first and second moving elements from a positioning error between a target moving position of the moving body and a current position of the moving body detected from the position sensor and from the phase and amplitude values stored in the memory means; driving command value output means for outputting driving command values to the first and second moving elements based on the calculation result of the phase-and-others calculating means; position discriminating means for discriminating whether the positioning error falls within a permissible error range set in advance and whether a feeding position of the feeding unit falls within a region set in advance including an intermediate position of an expansion span; clamping means for clamping the moving body by at least two or more the feeding units when it is judged by the position discriminating means that the positioning error falls within the permissible error range and the feeding position of the feeding unit falls within the set region; change-over clamping means for clamping or releasing the feeding units alternately while keeping the moving body at rest when it is judged by the position discriminating means that although the positioning error falls within the permissible error range, the feeding position of the feeding unit is out of the set region, for setting the feeding position of the feeding unit at the intermediate position of the expansion span when the feeding unit is released and for clamping the moving body at least by two or more feeding units after that; control propriety discriminating means for discriminating whether the feeding position of the feeding unit falls within the region set in advance including the intermediate position of the expansion span after completing to clamp the moving body by the clamping means or the change-over clamping means; and position control means for performing integral control on the feeding units in the moving direction when it is discriminated by the control propriety discriminating means that the feeding position falls within the set region based on a positioning error between the target moving position of the moving body and the current position of the moving body detected by the position sensor.

According to the present invention or specifically to claim 6 thereof, a super-precision positioning system is arranged such that the phase and amplitude command values to be given to the first and second moving elements are calculated by the phase-and-others calculating means from the positioning error between the target moving position and the current position of the moving body, the moving speed, and the phase and amplitude values stored in the memory means in advance.

According to the present invention or specifically to claim 7 thereof, the super-precision positioning system is arranged such that the control made by the position control means is PID control.

The specific nature of the invention, as well as other objects, uses and advantages thereof, will clearly appear from the following description and from the accompanying drawings.

BRIEF DESCRIPTION OF DRAWINGS

FIG. 5 shows control patterns of one period for moving a moving body;

FIG. 7 shows control patterns of the feeding mechanism using the feeding units shown in FIG. 3;

FIG. 9 is a flowchart of a first embodiment of the present invention;

FIG. 14 is a block diagram of integral control;

FIG. 15 is a flowchart of a fourth embodiment of the present invention;

DETAILED DESCRIPTION OF THE PREFERRED EMBODIMENTS

Figure 1:
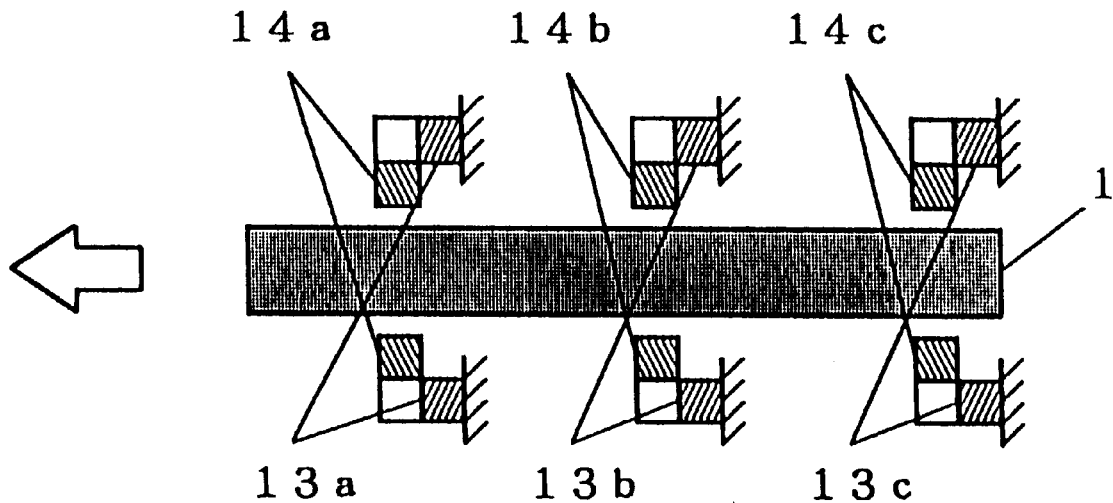
FIG. 1 is a diagram showing a structure of a feeding mechanism.
Figure 2:
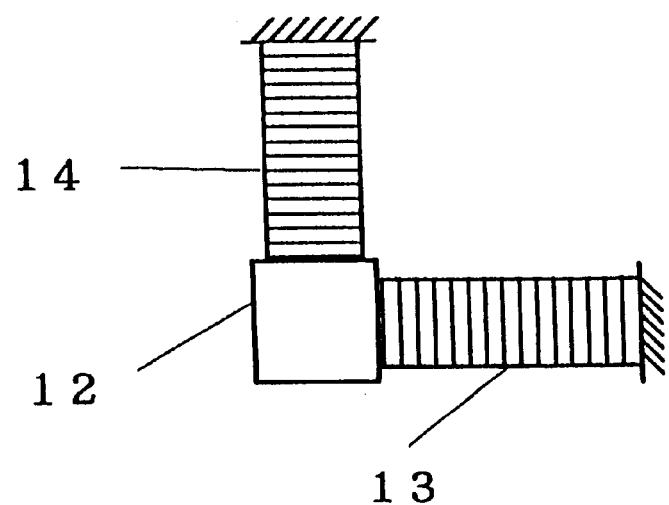
FIG. 2 is a diagram showing a structure of a feeding unit.
Figure 3:
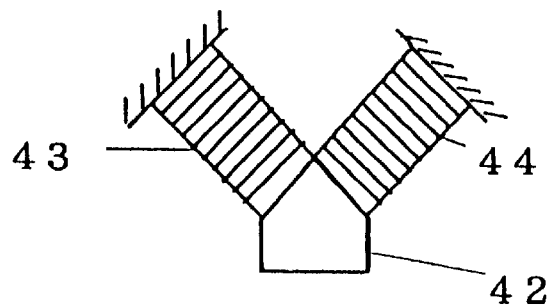
FIG. 3 is a diagram showing a structure of another feeding unit.

Preferred embodiments of the present invention will be explained below with reference to the drawings. FIGS. 1 through 9 show one embodiment of the present invention. In FIG. 1, one of the ends of a pair of feeding elements 13a are secured at spatial positions which face each other while interposing a moving body 1 therebetween in the direction vertical to a moving direction of the moving body 1. Further, one of the ends of a pair of clamping elements 14a are secured to the other of the ends of the pair of feeding elements 13a and the other ends of the clamping elements 14a are opened extendibly in the direction vertical to the moving direction of the moving body 1 so as to be able to clamp or release the moving body 1. A first feeding unit is composed of the pair of feeding elements 13a and the pair of clamping elements 14a described above. A feeding mechanism 10 comprises the first through third feeding units having the same structure in the moving direction of the moving body 1. The feeding element 13a and the clamping element 14a are composed of a piezoelectric element (PZT) for example so as to be able to transduce applied voltage to displacement. It is noted that the feeding unit may be constructed as shown in FIG. 2 or FIG. 3. In FIG. 2, one end of the feeding element 13 is secured at a predetermined spatial position and the other end thereof is fixed to one end face of a clamp block 12 for clamping the moving body 1. One end of the clamping element 14 is fixed to the other end face of the clamp block 12 in the direction vertical to the moving direction of the moving body 1. The other end of the clamping element 14 is fixed at a predetermined spatial position. In FIG. 3, the moving element 43 is disposed within a plane to which the clamping and moving directions of the moving body 1 belong while forming a predetermined angle with the clamping direction of the moving body 1 such that one end thereof is fixed at a predetermined spatial position and the other end thereof is fixed to one end face of a clamp block 42 for clamping the moving body 1. A moving element 44 is disposed within a plane to which the clamping and the moving directions of the moving body 1 belong while forming a predetermined angle with the clamping direction of the moving body 1 such that one end thereof is fixed to the other end face of the clamp block 42 and the other end thereof is fixed at a predetermined spatial position. Here, the feeding element 13 and the moving element 43 (or the moving element 44) correspond to a first moving element and the clamping element 14 and the moving element 44 (or the moving element 43) correspond to a second moving element.

Figure 4:
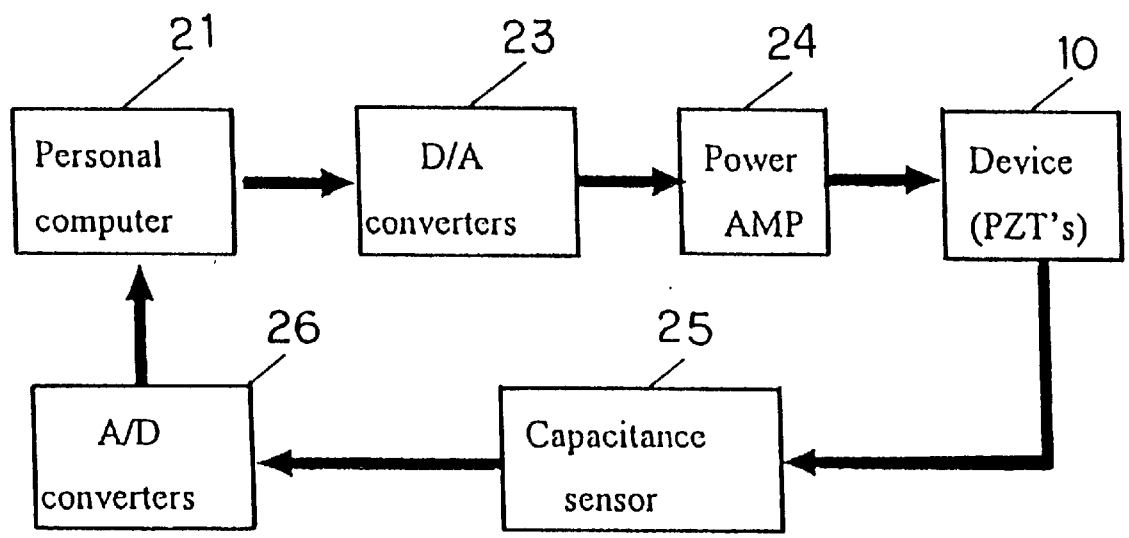
FIG. 4 is a diagram showing a structure of the whole system.

FIG. 4 is a diagram showing a structure of the whole system for controlling the feeding mechanism 10. A computer 21 is provided with a memory 22 (which corresponds to memory means, not shown) to calculate phase and amplitude command values of the feeding elements 13a through 13c and clamping elements 14a through 14c. A D/A converter 23 and a driving amplifier 24 are arranged so as to convert the command values into voltages. In case when position feedback control described later is to be performed, a position sensor 25 is set and a signal thereof is input to the computer 21 after converting it by an A/D converter 26.

Next, the control of the feeding mechanism 10 will be explained with reference to FIGS. 5 through 9.

Figure 6:
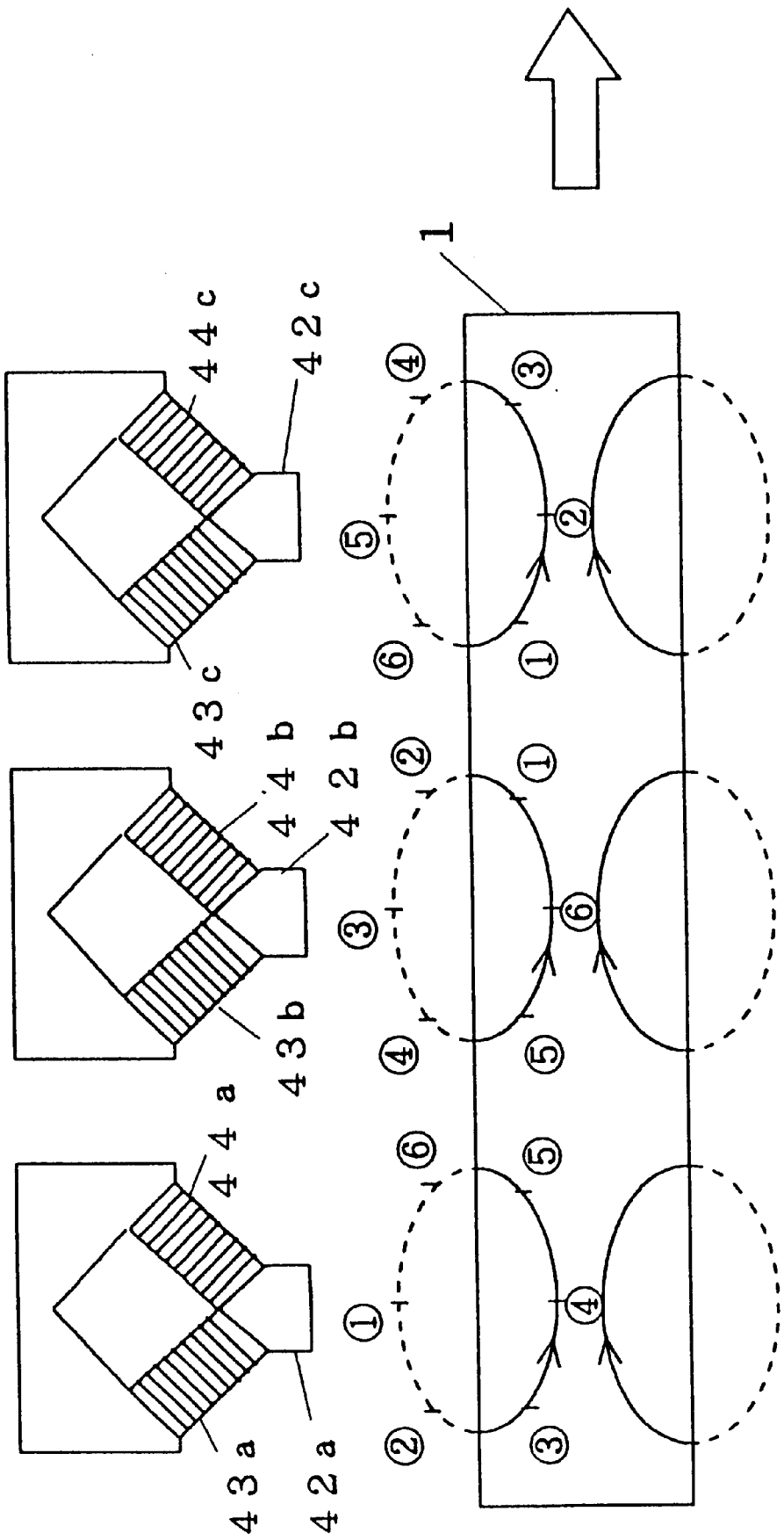
FIG. 6 is a conceptual diagram showing a movement of a feeding mechanism using the feeding units shown in FIG. 3.

FIGS. 5 through 7 show control patterns of one period for moving the moving body 1. FIG. 5 shows control patterns when the feeding units shown in FIGS. 1 and 2 are used and FIG. 7 shows control patterns when the feeding units shown in FIG. 3 are used. In FIG. 5 at first, the clamping elements 14a and 14c are in a clamping state during Timing 1 and Timing 2. The clamping element 14b is being released. Voltage is applied gradually to the feeding elements 13a and 13c while maintaining this state. As a result, the moving body 1 may be moved. The displacement of the feeding element 13b is gradually reduced during this time. At Timing 3 (at phase $^1$), the clamping element 14b is put into a clamping state and the clamping elements 14a and 14c are released. The clamping element 14b is in the clamping state and the clamping elements 14a and 14c are in the released state during the time between Timing 4 and Timing 5. Voltage is applied gradually to the feeding element 13b while maintaining this state. As a result, the moving body 1 may be moved further. Displacements of the feeding elements 13a and 13c are reduced gradually during this time. Then, the clamping elements 14a and 14c are put into a clamping state again during the time between Timing 5 and Timing 6 (at phase 2 $^1$), thus returning to the state of phase 0. The feeding mechanism 10 can drive the moving body 1 throughout a long stroke by continuously repeating the operation of such period.

It is noted that when the moving body 1 is to be returned, the clamping elements 14a and 14c are put into the clamping state and the clamping element 14b is released. Plus voltage is applied to the feeding element 13b to increase or extend its displacement while maintaining this state. The clamping element 14b is put into the clamping state while maintaining this state. Then, the clamping elements 14a and 14c are released from clamping. Next, when the voltage of the feeding element 13b which is in the clamping state is reduced within the range of the plus voltage, the displacement of the feeding element 13b is reduced and the moving body 1 retreats. The return operation may be performed continuously by giving similar instructions to the clamping elements 14a and 14c which are in the released state.

Figure 8:
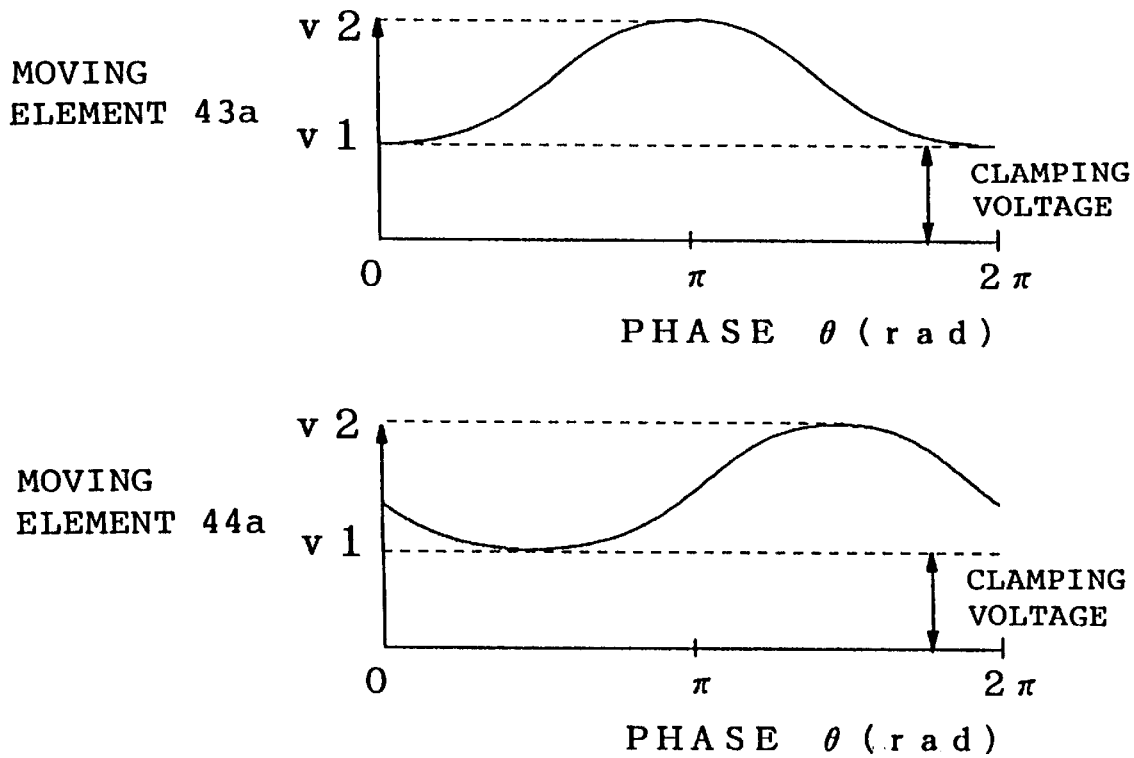
FIG. 8 is a diagram showing voltage patterns applied to each moving element.

FIG. 6 shows a case when the feeding mechanism is constructed by using the feeding units shown in FIG. 3. In the figure, numerals 1 through 6 show Timings. Sine voltage is applied to the moving elements 43a, 43b and 43c by differentiating their phases by 120 degrees each in order to feed the moving body 1 in the moving direction. Further, phases of the moving elements 43a, 43b and 43c and the moving elements 44a, 44b and 44c are differentiated by 90 degrees each in order to continuously repeat clamping and releasing operations. In order to facilitate the understanding, a conceptual diagram of feeding at each timing of each feeding unit is shown as an ellipse around the moving body 1 in FIG. 6. For example, as for the first feeding unit, Timing 1 represents a state in which the clamp block 42a is separated most from the moving body 1 and Timing 4 represents a state in which the clamp block 42a strongly clamps the moving body 1 most. The state how the moving body 1 is moved in the moving direction at each timing may be confirmed by showing the conceptual diagram of feeding of each feeding unit as an ellipse in the same manner. It is noted that the voltage actually applied to each moving element is superimposed with clamping voltage in order to assure predetermined rigidity as shown in FIG. 8.

FIG. 9 is a flowchart showing the operation of the first embodiment of the present invention.

At first, the phases and voltage waveforms (amplitude values) of one period explained with reference to FIG. 5 or FIG. 7 are stored in the memory 22 as periodic functions in Step 1 (shown as S1 in the figure). Then, variables of a target moving position, a moving speed and the like of the moving body 1 are input in Step 2. An increment of the phase is calculated based on the input variables in Step 3 and voltage is read from the periodic functions stored in the memory 22 to calculate a voltage command value in Step 4. When the variable has been input so as to slow down the moving speed of the moving body 1 for example, the increment of the phase is reduced. When the variable has been input so as to increase the moving speed, the increment of the phase is increased. However, it is possible to process so as to reduce the amplitude command value when the variable has been input so as to slow down the moving speed of the moving body 1, and so as to increase the amplitude command value when the variable has been input so as to increase the moving speed. The processes in Steps 3 and 4 correspond to phase-and-others calculating means. After that, it is judged whether the position of the moving body 1 is within a permissible error range of the target moving position or not in Step 5. When the position is not within the permissible error range of the target moving position, voltage is applied to each feeding element and each clamping element via the D/A converter 23 and the driving amplifier 24 from the computer 21 based on the voltage command values found in Step 4 in the process in Step 6. This process corresponds to driving command value output means. When the position is within the permissible error range of the target moving position, all the clamping elements are put into the clamping state (or voltage which exceeds the clamping voltage is applied equally to all the moving elements) to clamp the moving body 1 (hereinafter referred to as a clamping operation) in the process in Step 7. This process corresponds to clamping means. As a result, it becomes possible to increase the rigidity in controlling a load (e.g. cutting work) by the moving body 1 or the like by more than two times (or about three times in the present embodiment) by performing the clamping operation after moving a long stroke and reaching to the target moving position. While three feeding units are employed in the present embodiment, the rigidity may be increased proportionally by increasing the number of feeding units. Further, the rigidity may be increased by performing the clamping operation on the two or more feeding units, not performing on all the feeding units. Although the moving body 1 may be moved automatically to the target moving position as described above by inputting the target moving position of the moving body 1 as the variables, it is possible to arrange such that the moving body 1 is moved not inputting the variables but only during when an operator presses a push button. It is possible to change the moving speed of the moving body 1 by inputting the moving speed as the variable and by calculating the phase and the like in Step 3 also in this case. That is, the moving speed may be changed just by changing either the phase or the amplitude applied to the feeding elements and clamping elements. Further, if no moving speed is also input as a variable, the move of the moving body 1 is controlled based on the periodic functions stored in advance in the memory 22 in Step 1. Because the above-mentioned control is made in an open loop without performing feedback control, the position sensor 25 may not be necessary.

Figure 10:
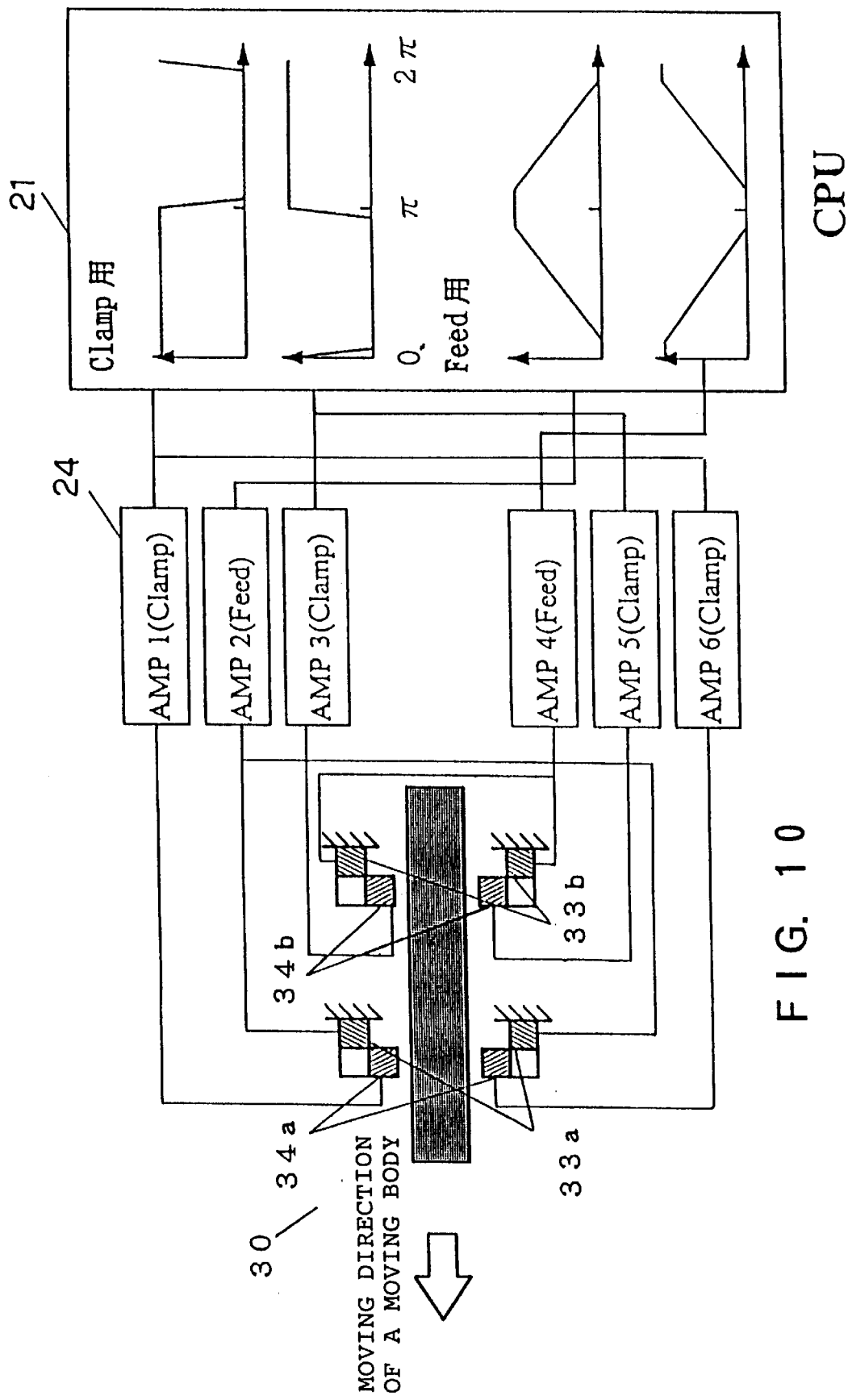
FIG. 10 is another diagram showing a structure of another feeding mechanism.

It is noted that while FIG. 10 is a diagram showing a structure of another feeding mechanism (feeding mechanism 30) n which two feeding units are disposed, it is the same with that described above that movement of the moving body 1 is controlled based on the periodic functions stored in the memory 22 in advance and the rigidity may be increased by about two times by performing the clamping operation after reaching to the target moving position. The control is also basically the same even when four or more feeding units are disposed. It is possible to process in the same manner with the control section having the same structure even when the number of feeding units is increased. Further, because the greater the number of feeding units, the greater the number of feeding units which process the same one step is at this time, the rigidity in moving the moving body 1 may be enhanced as a result.

Next, a second embodiment of the present invention will be explained with reference to a flowchart in FIG. 11.

It is noted that because the feeding mechanism 10 and the structure of the whole system of the present embodiment are the same with those in the first embodiment, their explanation will be omitted here (the same also applies to each embodiment which follows). Further, the same elements of the flowchart of the present embodiment with those of the first embodiment are denoted with the same reference numerals and their explanation will be omitted.

According to the second embodiment, the moving body 1 is driven by open loop control until the target moving position and the position feedback control is carried out in the final positioning operation.

Figure 11:
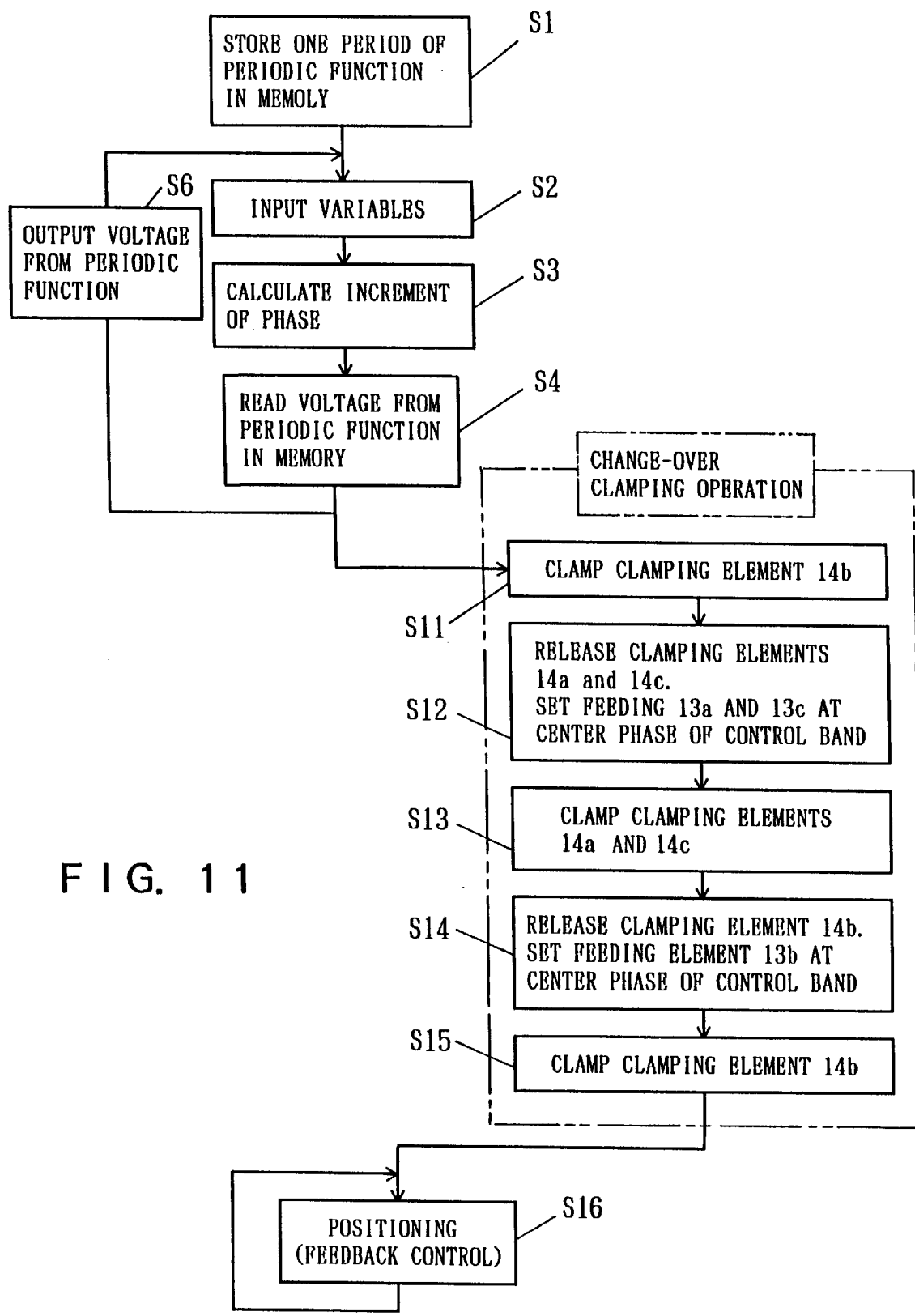
FIG. 11 is a flowchart of a second embodiment of the present invention.

In FIG. 11, when the variables of the target moving position and moving speed of the moving body 1 are input in Step 2, periods and amplitude for reaching to the target moving position are calculated based on the input variables in Step 3. The variables of the both target moving position and moving speed are not always necessary to be input and it is possible to control the move of the moving body 1 by storing those variables in the memory 22 in advance together with the periodic function even when there is totally no variable to be input. When the moving body 1 reaches to the target moving position after such move, a change-over clamping operation which will be described below is performed. The controls up to Step 6 are made in the open loop. The control up to Step 6 is performed in the open loop.

In Step 11, the clamping element 14*b* is put into the clamping state (or predetermined voltage over clamping voltage V1 is applied to the moving element 43*b* or the moving element 44*b*). In Step 12, the clamping elements 14*a* and 14*c* are released or the voltage applied to the moving elements 43*a* and 44*a* as well as to the moving elements 43*c* and 44*c* is zeroed. Here, the voltage is set at 0 volt which is below the clamping voltage V1 in order to avoid the moving elements 43 and 44 from contacting with the moving body 1 when the clamp is released. The same applies also to the following case. Then, voltage is applied so that the moving body 1 stops at an intermediate position of an expansion span which the piezoelectric element has as the feeding position of the feeding elements 13*a* and 13*c* (a predetermined range set in advance centering on this intermediate position is referred to as a control band hereinbelow). Or, if the voltage applied to the moving elements 43*a* and 44*a* and the moving elements 43*c* and 44 is zeroed, it just comes to the intermediate position of the expansion span which the piezoelectric element has. After stopping at the intermediate position, the moving body 1 is clamped by the clamping elements 14a and 14c in Step 13. Or, predetermined voltage above the clamping voltage V1 is applied to the moving elements 43a, 44a, 43c and 44c. The clamping element 14b is released in Step 14 and voltage is applied so that the moving body 1 stops at the intermediate position of the expansion span which the piezoelectric element has as the feeding position of the feeding element 13b. Or, the voltage applied to the moving elements 43b and 44b is zeroed. After stopping at the intermediate position, the clamping element 14b is put into the clamp state. Or, predetermined voltage above the clamp voltage V1 is applied to the moving elements 43b and 44b. The processes in Steps 11 through 15 correspond to change-over clamping means. It is noted that the procedure of the change-over clamping operation may be arranged such that Steps 11 and 12 are performed after performing Steps 13 through 15, beside the arrangement of the present embodiment. Such case is also considered to be included in the change-over clamping means. Then, the final positioning is performed by implementing the position feedback control to the feeding elements 13a through 13c (or the moving elements 43 and 44) based on a positioning error between the current position detected by the position sensor 25 and the target moving position in Step 16.

Figure 12:
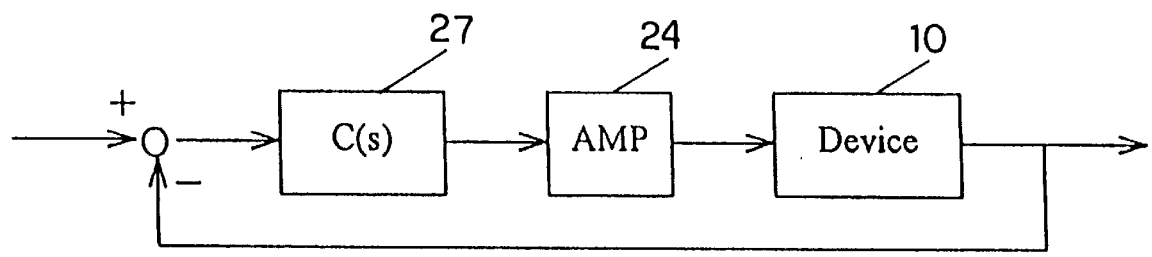
FIG. 12 is a block diagram of feedback control.

FIG. 12 is a block diagram of the feedback control. Here, C(S) may be realized by using the modern control or the classic control such as PID. According to the second embodiment, the feeding position of all the feeding elements (or the moving elements) may be stopped at any time at the intermediate position of the expansion span which the piezoelectric element has without moving the moving body 1 wherever the moving body 1 is located after reaching to the target moving position. That is, a range of control to a load which follows may be taken widely by presetting the feeding position of the feeding element (or the moving element) at the intermediate position. If the intermediate position of the expansion span is set as the center, both degrees of extension and contraction which are required in the control centering on this center may be fully assured without bias. Further, the change-over clamping operation allows the rigidity which is about three times of that of the positioning control using one clamping element to be obtained in case of the present embodiment. However, it is not always necessary to put all the clamping elements (or the moving elements) in the clamp state in the change-over clamping operation. For instance, if an enough rigidity can be obtained by two clamping elements (or moving elements), it is possible to modify so as to put the two clamping elements (or the moving elements) into the clamp state in correspondence to an object of load. The number of the clamping elements (or the moving elements) which clamp the load may be increased when more rigidity is required. This can be easily dealt by increasing the number of feeding units.

Figure 13:
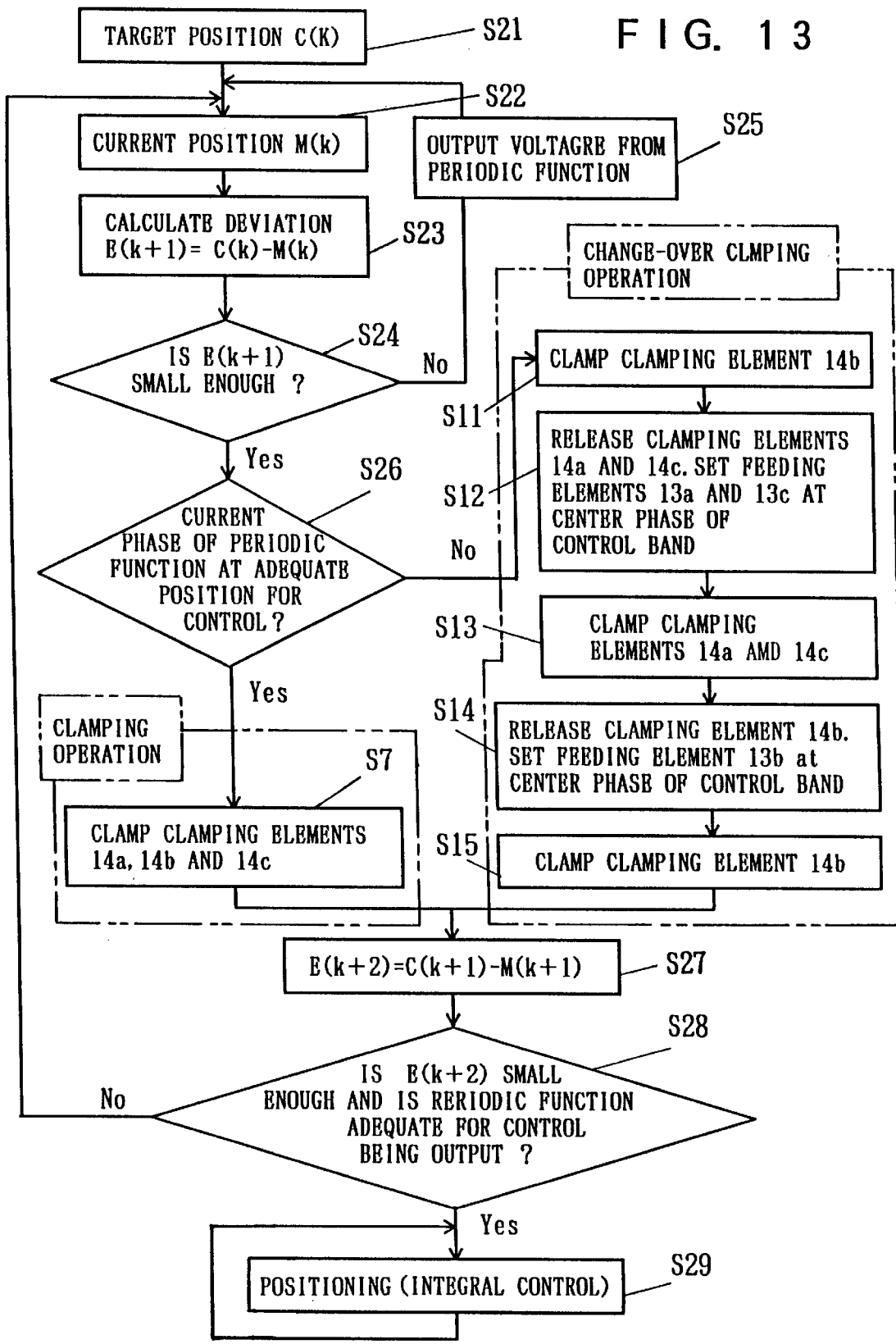
FIG. 13 is a flowchart of a third embodiment of the present invention.

Next, a third embodiment of the present invention will be explained with reference to a flowchart in FIG. 13.

It is noted that the same components of the present embodiment with those in the first and second embodiments are denoted with the same reference numerals and an explanation thereof will be omitted here.

According to the third embodiment, the feedback control is made throughout the whole range including the move of the moving body 1.

At first, variables of the target moving position and moving speed of the moving body 1 are input in Step 21. The current position of the moving body 1 detected by the position sensor 25 is written to the computer 21 in Step 22 and a positioning error with the target moving position is calculated in Step 23. It is then judged whether this positioning error has become fully small or not in Step 24. Before it becomes small, the phase and amplitude are read from the periodic functions stored in the memory 22 to calculate phase and amplitude command values to be given to the feeding elements and clamping elements (or moving elements 43 and 44). This process corresponds to phase-and-others calculating means. Then, based on the calculation result, driving command values are output to the feeding elements and the like in Step 25. This process corresponds to driving command value output means. Accordingly, the moving body 1 is moved. Then, when it enters a permissible positioning error range set in advance, it is judged whether the phase of the current periodic function falls within the control band or not in Step 26. When it is judged that it falls within the control band, the clamping operation is performed as it is in Step 7 because the controllable range to the load is fully assured. When it is out of the control band on the other hand, the change-over clamping operation is performed in Steps 11 through 15 at first and then the operation for clamping the clamping element (or the moving element) is carried out after fully assuring the controllable range to the load while maintaining the position of the moving body 1. The processes in Steps 24 and 26 correspond to position discriminating means. After performing the clamping operation or the change-over clamping operation, a positioning error between the target moving position and the current position of the moving body 1 is calculated again in Step 27. It is then judged in Step 28 whether the phase of the current periodic function falls within the control band or not. Such judgment is made because the position of the moving body 1 might be shifted subtly by physical factors in clamping or releasing the clamp of the moving body 1 when the clamping operation or the change-over clamping operation is performed, though it should not change before such operation in principle. Accordingly, the process in Step 28 may be omitted if it is confirmed by experiments or the like that such shift of position is always small or that the physical factors are always small. The process in Step 28 corresponds to control propriety discriminating means. When it is judged as a result that it is out of the control band, the control is repeated again from the beginning (Step 22) so that it falls within the control band. When it falls within the control band on the other hand, integral control to the feeding elements 13a through 13c (or the moving elements 43 and 44) is made in Step 29. The process in Step 29 corresponds to position control means. FIG. 14 is a block diagram showing a structure of the integral control. It becomes possible to realize super-precision positioning, high rigidity and specially high static rigidity by performing such integral control. A positioning resolution of about 3 nm has been confirmed. However, this value is considered to be reduced further when it is measured by using a more high resolution measuring system. The high static rigidity of 1700 N/$\mu$m or more has been also achieved according to measured data.

It is noted that it is possible to input only the target moving position and to decide the moving speed based on the periodic function stored in the memory 22 in advance as described before in inputting the variables. Further, it is possible to arrange such that the moving speed of the moving body 1, i.e. the phase or amplitude command value given to the feeding element or the clamping element (or the moving element), may be varied (including stepwise variation) based on the degree of the positioning error found in Step 23. The calculation of the phase or amplitude command value is considered to be included in the phase-and-other calculating means.

Next, a fourth embodiment of the present invention will be explained with reference to a flowchart in FIG. 15.

It is noted that the same components with those in the first through third embodiments will be denoted with the same reference numerals and an explanation thereof will be omitted here.

Figure 16:
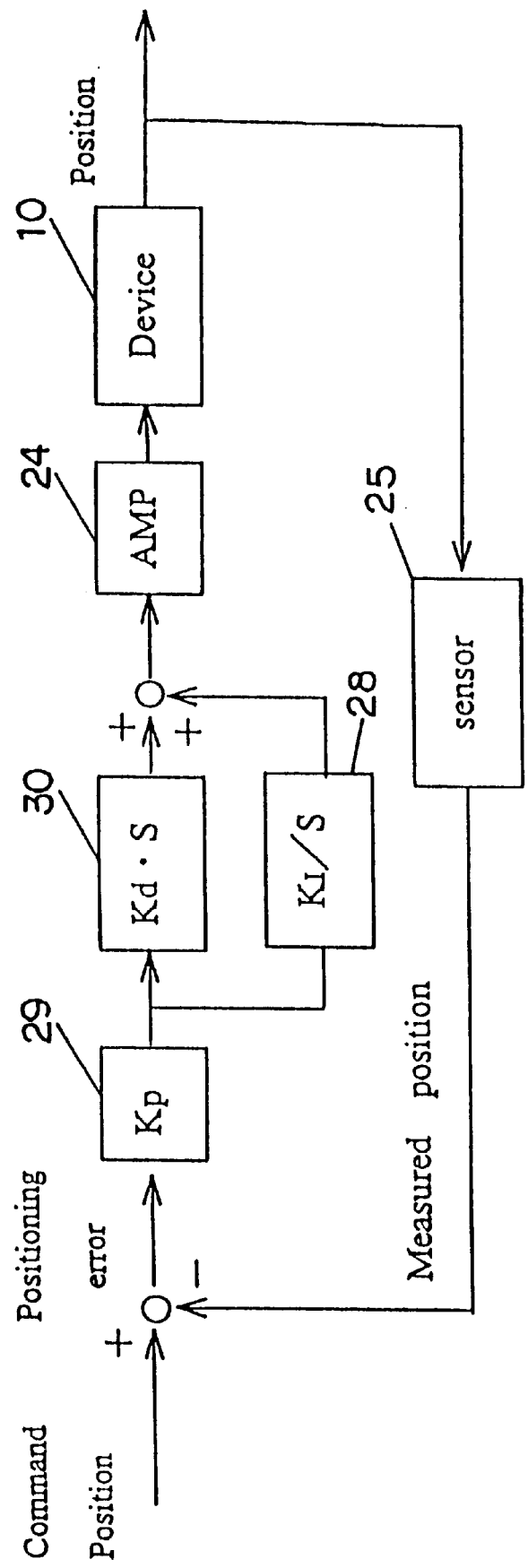
FIG. 16 is one example of a block diagram using PID control.

In the fourth embodiment, steps are the same with those of the third embodiment up to Step 28 and the final positioning control is made by PID control in Step 30. Such PID control also allows a static rigidity to be enhanced. FIG. 16 is a block diagram of one example using the PID control.

As described above, according to the present invention, the super-precision positioning system is constructed with the feeding mechanism for controlling the move based on the spanworm method and the clamping means for clamping the moving body after completing the move, so that the moving body may be moved throughout a long stroke and a high rigidity may be assured in the control after the completion of the move.

Further, according to the present invention, the move of the moving body may be controlled flexibly by allowing to change either or both of the moving speed or/and the target moving position of the moving body.

According to the present invention, the system is arranged so as to perform the change-over clamping operation after reaching to the target moving position and then to perform the position feedback control, so that it becomes possible to perform the super-precision positioning control while taking a wide controllable range to the load and to assure the high rigidity.

According to the present invention, the move of the moving body may be controlled flexibly by allowing to change the moving speed.

According to the present invention, the system is arranged so as to perform the feedback control throughout the whole range, to perform the clamping operation or change-over clamping operation after reaching to the target moving position and to perform the integral control, so that it becomes possible to realize the super-precision positioning, the wide controllable

What is claimed is:

1. A super-precision positioning system, comprising:
    a feeding mechanism having a plurality of feeding units disposed in a moving direction of a moving body, each of the feeding units having first and second moving elements for clamping and unclamping the moving body or feeding the moving body in the moving direction from an initial position to a target movement position and returning the moving body to the initial position, the first and second moving elements being disposed within a plane defined by the moving direction of the moving body and a direction of clamping and unclamping the moving body;
    a position sensor for detecting a current position of the moving body in the moving direction;
    memory means for storing phase and amplitude values of the first and second moving elements in advance to repeatedly carry out a series of operations of clamping the moving body by any one of the feeding units, extending the first and second moving elements in the moving direction to feed the moving body and then unclamping the moving body and returning the moving body in the moving direction by changing the phase value of each of the feeding units;
    calculating means for calculating phase and amplitude command values for the first and second moving elements based on the target movement position of the moving body and the phase and amplitude values stored in the memory means;
    driving command value output means for outputting driving command values to the first and second moving elements based on the calculation result of the calculating means;
    change-over clamping means for clamping or unclamping the feeding units alternately while maintaining the moving body at rest when the moving body reaches the target movement position, setting a feeding position of the feeding units at a predetermined position region when the feeding unit is unclamped, and thereafter clamping the moving body at least by two or more of the feeding units; and
    feedback control means for performing position feedback control of the feeding units in the moving direction after clamping of the moving body by the change-over clamping means based on a positioning error between the target movement position and the current position of the moving body.

2. A super-precision positioning system according to claim 1; wherein the phase and amplitude command values for the first and second moving elements are calculated by the calculating means from the target movement position and a moving speed of the moving body and from the phase and amplitude values stored in the memory means.

3. A super-precision positioning system according to claim 1; wherein each of the feeding units has a piezoelectric element; and wherein the predetermined position region comprises an intermediate position of an expansion span of the piezoelectric element.

4. A super-precision positioning system, comprising:
    a feeding mechanism having a plurality of feeding units disposed in a moving direction of a moving body, each of the feeding units having first and second moving elements for clamping and unclamping the moving body or feeding the moving body in the moving direction from an initial position to a target movement position and returning the moving body to the initial position, the first and second moving elements being disposed within a plane defined by the moving direction of the moving body and a direction of clamping and unclamping the moving body;
    a position sensor for detecting a current position of the moving body in the moving direction;
    memory means for storing phase and amplitude values of the first and second moving elements in advance to repeatedly carry out a series of operations of clamping the moving body by any one of the feeding units, extending the first and second moving elements in the moving direction to feed the moving body and then unclamping the moving body and returning the moving body in the moving direction by changing the phase value of each of the feeding units;
    calculating means for calculating phase and amplitude command values for the first and second moving elements from a positioning error between the target movement position and the current position of the moving body detected by the position sensor and from the phase and amplitude values stored in the memory means;

driving command value output means for outputting driving command values to the first and second moving elements based on the calculation result of the calculating means;

position discriminating means for discriminating whether the positioning error falls within a permissible error range set in advance and whether a feeding position of one of the feeding units falls within a predetermined position region;

clamping means for clamping the moving body by at least two or more of the feeding units when it is judged by the position discriminating means that the positioning error falls within the permissible error range and the feeding position of the feeding unit falls within the predetermined position region;

change-over clamping means for clamping or unclamping the feeding units alternately while maintaining the moving body at rest when it is judged by the position discriminating means that the positioning error falls within the permissible error range and that the feeding position of the feeding unit is out of the predetermined position region, setting the feeding position of the feeding unit in the predetermined position region when the feeding unit is unclamped, and thereafter clamping the moving body at least by two or more of the feeding units;

discriminating means for discriminating whether the feeding position of the feeding unit falls within the predetermined position region after the moving body is clamped by the clamping means or the change-over clamping means; and position control means for performing integral control of the feeding units in the moving direction when it is discriminated by the discriminating means that the feeding position of the feeding unit falls within the predetermined position region based on the positioning error between the target movement position of the moving body and the current position of the moving body detected by the position sensor.

5. A super-precision positioning system according to claim 4; wherein the phase and amplitude command values for the first and second moving elements are calculated by the calculating means from the positioning error between the target movement position and the current position of the moving body, a moving speed of the moving body, and the phase and amplitude values stored in the memory means.

6. A super-precision positioning system according to claim 5; wherein the control means controls the feeding units by PID control.

7. A super-precision positioning system according to claim 5; wherein the control means controls the feeding units by PID control.

8. A super-precision positioning system according to claim 4; wherein each of the feeding units has a piezoelectric element; and wherein the predetermined position region comprises an intermediate position of an expansion span of the piezoelectric element.

9. A positioning system comprising:

a feeding mechanism having a plurality of feeding units disposed in a moving direction of a moving body, each of the feeding units having clamp members for clamping and unclamping the moving body and moving members for reciprocating the moving body in the moving direction from an initial position to a target position;

a memory device for storing preselected phase and amplitude values of the moving members;

a position sensor for detecting a current position of the moving body in the moving direction;

a memory device for storing preselected phase and amplitude values of the moving elements;

a calculating device for calculating phase and amplitude command values for the moving members based on the target position of the moving body and the phase and amplitude values stored in the memory device;

an output device for outputting driving command values to the moving members based on the calculation result of the calculating device;

a control device for controlling the feeding units to alternately clamp and unclamp the moving body while maintaining the moving body at rest when the moving body reaches the target position, setting a feeding position of the feeding units at a predetermined position when the feeding units are unclamped, and thereafter controlling at least two or more of the feeding units to clamp the moving body; and a feedback control device for performing position feedback control of the feeding units in the moving direction after the moving body is clamped by the two or more of the feeding units based on a positioning error between the target position and the current position of the moving body.

10. A positioning system according to claim 9; wherein the calculating device calculates the phase and amplitude command values using the target position and a moving speed of the moving body and the phase and amplitude values stored in the memory device.

* * * * *

UNITED STATES PATENT AND TRADEMARK OFFICE
CERTIFICATE OF CORRECTION

Figure 17:
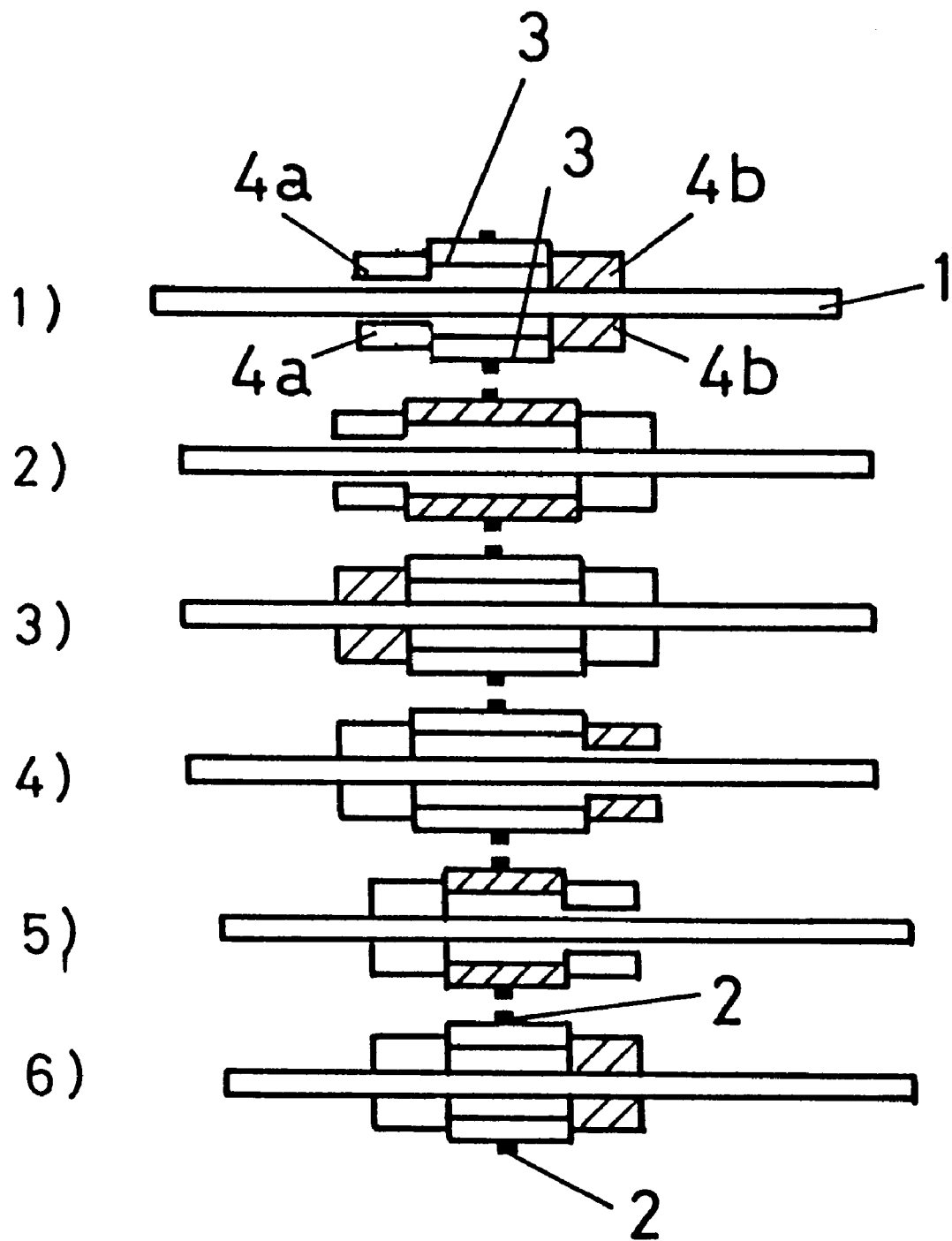
FIG. 17 is a diagram showing a driving principle for controlling movements by means of a prior art spanworm method.
Figure 18:
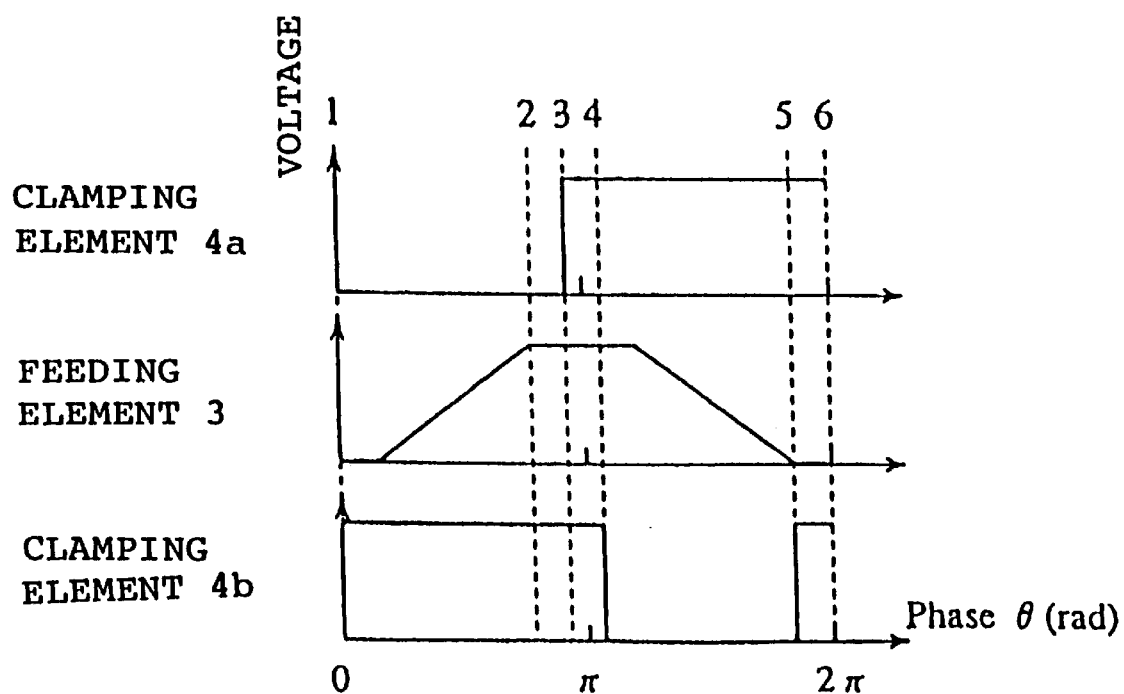
FIG. 18 is a diagram showing patterns of driving voltages applied to each piezoelectric element.

PATENT NO. : 5,984,501
DATED : November 16, 1999
INVENTOR(S) : Katsura Tomotaki, Shinichi Nomura and Heung Chul Shin It is certified that error appears in the above-identified patent and that said Letters Patent is hereby corrected as shown below:

Column 1,
Line 42, "1) through 6) in Fig. 17" should read -- shown in Figs. 17 (a) -17(f), respectively --.

Column 5,
Line 9, "Fig. 17 is a diagram" should read -- "Figs. 17(a) -17 (f) are diagrams --.

Signed and Sealed this

Eighteenth Day of December, 2001

Attest:

Attesting Officer

JAMES E. ROGAN
Director of the United States Patent and Trademark Office